United States Patent
Devarasetty et al.

(10) Patent No.: US 6,856,908 B2
(45) Date of Patent: Feb. 15, 2005

(54) PASSIVE CLEAR AIR TURBULENCE DETECTION AVIONICS SYSTEM AND METHOD

(75) Inventors: Krishna Devarasetty, Kentwood, MI (US); Ken L. Rodgers, Westerville, OH (US)

(73) Assignee: L-3 Communications Avionics Systems, Inc., Grand Rapids, MI (US)

( * ) Notice: Subject to any disclaimer, the term of this patent is extended or adjusted under 35 U.S.C. 154(b) by 0 days.

(21) Appl. No.: 10/412,052

(22) Filed: Apr. 11, 2003

(65) Prior Publication Data

US 2004/0204853 A1 Oct. 14, 2004

(51) Int. Cl.[7] .......................................... G06F 169/00
(52) U.S. Cl. ...................................................... 702/3
(58) Field of Search ...................... 702/3, 4; 73/170.02, 73/170.16, 170.24, 170.27; 340/968; 342/72, 72.5

(56) References Cited

U.S. PATENT DOCUMENTS

| | | | | |
|---|---|---|---|---|
| 3,359,557 A | * | 12/1967 | Fow et al. | 342/351 |
| 3,380,055 A | * | 4/1968 | Fow et al. | 342/351 |
| 4,023,408 A | | 5/1977 | Ryan et al. | |
| 4,091,326 A | | 5/1978 | Hill | |
| 4,346,595 A | * | 8/1982 | Frosch et al. | 73/178 R |
| 4,996,473 A | | 2/1991 | Markson et al. | |
| 5,117,689 A | * | 6/1992 | Gary | 73/178 R |
| 5,699,245 A | | 12/1997 | Herold | |
| 5,771,020 A | | 6/1998 | Markson et al. | |
| 6,215,294 B1 | | 4/2001 | Coleman | |
| 6,246,367 B1 | | 6/2001 | Markson et al. | |
| 6,405,133 B1 | | 6/2002 | Schwinn et al. | |
| 6,456,226 B1 | | 9/2002 | Zheng et al. | |
| 6,590,520 B1 | * | 7/2003 | Steele et al. | 342/26 |
| 2002/0075170 A1 | | 6/2002 | Schwinn et al. | |
| 2002/0133295 A1 | | 9/2002 | Schwinn et al. | |
| 2002/0163446 A1 | | 11/2002 | Schwinn et al. | |

* cited by examiner

Primary Examiner—Donald McElheny, Jr.
(74) Attorney, Agent, or Firm—Van Dyke, Gardner, Linn & Burkhart, LLP

(57) ABSTRACT

A passive clear turbulence (CAT) detection system for use on-board an aircraft comprises: an antenna for receiving electromagnetic radiation and for generating electrical signals representative thereof; and a processor for processing the electrical signals with at least one CAT waveform signature to detect CAT activity in relation to the aircraft. Also disclosed is a method of detecting clear air turbulence (CAT) from an aircraft, the method comprising the steps of: receiving electromagnetic radiation and generating electrical signals representative thereof; and processing the electrical signals with at least one CAT waveform signature to detect CAT activity in relation to the aircraft.

43 Claims, 2 Drawing Sheets

PASSIVE CLEAR AIR TURBULENCE DETECTION AVIONICS SYSTEM AND METHOD

BACKGROUND OF THE INVENTION

The present invention relates to clear air turbulence (CAT) detection systems for aircraft, in general, and more particularly, to a passive CAT detection avionics system and method which receives electromagnetic signals produced by the CAT and processes such received signals with known CAT waveform signatures to identify CAT activity and determine the position thereof with respect to the aircraft.

Air turbulence is caused by many different atmospheric conditions and may at times be dangerous to aircraft flight. Inclement weather in the form of precipitation may cause damaging air turbulence and thus, should be detected by an aircraft and avoided. For this reason, the Federal Aviation Agency (FAA) requires that weather radars be installed on all commercial aircraft. Airborne weather radars use an active radar element usually mounted in the nose of the aircraft to transmit a radar signal and receive reflections from precipitation within the range of the radar signal. The reflections are processed to detect areas of precipitation which are displayed on a display screen color coded for intensity. Thus, a pilot can view the screen, determine the severity of a storm in the flight path, and make the determination of whether or not to alter the flight path to avoid the storm.

Another dangerous form of air turbulence arises from the updrafts and downdrafts which create lightning conditions. These conditions generally arise ahead or on the edge of any associated precipitation. Accordingly, weather radar systems may not detect this form of air turbulence until it is too late to avoid it. However, lightning detection instruments, such as the Stormscope® weather mapping system manufactured by Goodrich Avionic Systems Inc. under a number of different models, for example, can detect the electromagnetic energy produced by the lightning activity and map the location thereof on a display viewable by the pilot. Thus, a complementary avionics system combining both weather radar and lightning detection should provide a viable weather mapping of any precipitation or storm related activity.

Yet another dangerous form of air turbulence occurs under tranquil and cloudless conditions, but is capable of subjecting aircraft to strong updrafts and downdrafts. This form of air turbulence is known as clear air turbulence (CAT) and has heretofore been difficult to detect with commercially viable avionics. The real danger from CAT stems from its unexpected nature. Aircraft can fly into CAT without adequate warning to its passengers. As a result, passengers may be caught without safety belt protection, and if the turbulence is severe enough, it could cause personal injury to such passengers.

Experimental models of laser based CAT detectors have been found to work with adequate range capabilities, but are too expensive to produce as a commercially viable product. Radar based systems have not had as much success. Some have proposed using electromagnetic radiation lightning detectors as a CAT detector, but such lightning detection devices use analog filtering circuits and sophisticated signal processing to accommodate the unique characteristics of lightning and thunderstorms. While enhancing the weather mapping capabilities of the lightning detection systems, this filtering and processing sophistication diminishes the usefulness of such devices for CAT detection.

Accordingly, what is needed is a commercially viable CAT avionics system which can detect CAT at sufficient distances from the aircraft to permit the pilot to alter course and avoid the turbulence, or at least provide adequate warning for the passengers to fasten their safety belts as protection against personal injury. Such a system would result in a substantial improvement to flight safety.

SUMMARY OF THE INVENTION

In accordance with one aspect of the present invention, a passive clear air turbulence (CAT) detection system for use on-board an aircraft comprises: an antenna for receiving electromagnetic radiation and for generating electrical signals representative thereof; and a processor for processing the electrical signals with at least one CAT waveform signature to detect CAT activity in relation to the aircraft.

In accordance with another aspect of the present invention, a method of detecting clear air turbulence (CAT) from an aircraft comprises the steps of: receiving electromagnetic radiation and generating electrical signals representative thereof; and processing the electrical signals with at least one CAT waveform signature to detect CAT activity in relation to the aircraft.

In accordance with yet another aspect of the present invention, a passive clear air turbulence (CAT) detection system for use on-board an aircraft comprises: an antenna for receiving X and Y magnetic field components of electromagnetic radiation and generating X and Y electrical signals representative thereof, and for receiving an electric field component of electromagnetic radiation and for generating an E electrical signal representative thereof; a digitizer circuit for digitizing the E, X and Y electrical signals at a predetermined rate to produce E, X and Y digital data samples respectively representative thereof; a buffer memory for storing a predetermined number of each of the E, X and Y digital data samples into respective E, X and Y storage channels thereof; and a digital processor for: accessing the E digital data samples from the buffer memory and processing the accessed digital data samples with a convolution algorithm having embedded therein at least one CAT waveform signature for the E electrical signal to identify an E pulse which matches the at least one CAT waveform signature for the E electrical signal based on a first predetermined criteria; accessing the X digital data samples from the buffer memory and processing the accessed digital data samples with a convolution algorithm having embedded therein at least one CAT waveform signature for the X electrical signal to identify an X pulse which matches the at least one CAT waveform signature for the X electrical signal based on a second predetermined criteria; accessing the Y digital data samples from the buffer memory and processing the accessed digital data samples with a convolution algorithm having embedded therein at least one CAT waveform signature for the Y electrical signal to identify an Y pulse which matches the at least one CAT waveform signature for the Y electrical signal based on a third predetermined criteria; the processor operative to identify CAT activity by time correlating the identified E, X and Y pulses and to determine a position of the CAT activity in relation to the aircraft based on digital data samples of the corresponding E, X and Y pulses.

DETAILED DESCRIPTION OF THE INVENTION

The inventors have recognized that while CAT occurs under tranquil and cloudless conditions, the resulting strong updrafts, downdrafts and other components of turbulence produce electromagnetic energy in the form of radiation which may be monitored. Research has indicated that electromagnetic energy builds up and discharges during CAT activity, thus producing radiation pulses that may have cycles many minutes long. Accordingly, the discharges of the built up energy may be monitored from as far away as 400 nautical miles (nmi), for example. The inventors have also recognized that the pulsed electromagnetic radiation resulting from known areas of CAT may be monitored by a conventional passive antenna on-board an aircraft to collect data on the magnetic and electric component waveforms produced thereby. From a collection of this data, the inventors have established certain magnetic and electric component waveform signatures of CAT which are used in an embodiment of the present invention for detecting CAT a substantial distance from the aircraft. Due to advances in digital signal processing, any CAT waveform signature, no matter how complex, may be used in the present embodiment.

Thus, the airspace ahead and surrounding an aircraft may be monitored with a conventional on-board cross-looped and sense antenna, like the antenna from the Stormscope® avionics, model WX1000, for example, which receives electromagnetic radiation and converts it into electrical signals representative of the magnetic and electric components thereof. The converted electrical signals may be digitized, time-tagged, and stored. In the present embodiment, the stored data is analyzed by correlating it with predetermined CAT waveform signatures using digital signal processing techniques. The analysis may take into account the pulse shape, pulse polarity, and relative timing of the components of the monitored radiation for detection of CAT activity, and the direction-of-arrival and energy levels for determining position in range and bearing, for example, as will become more evident from the description found herein below.

Figure 1:
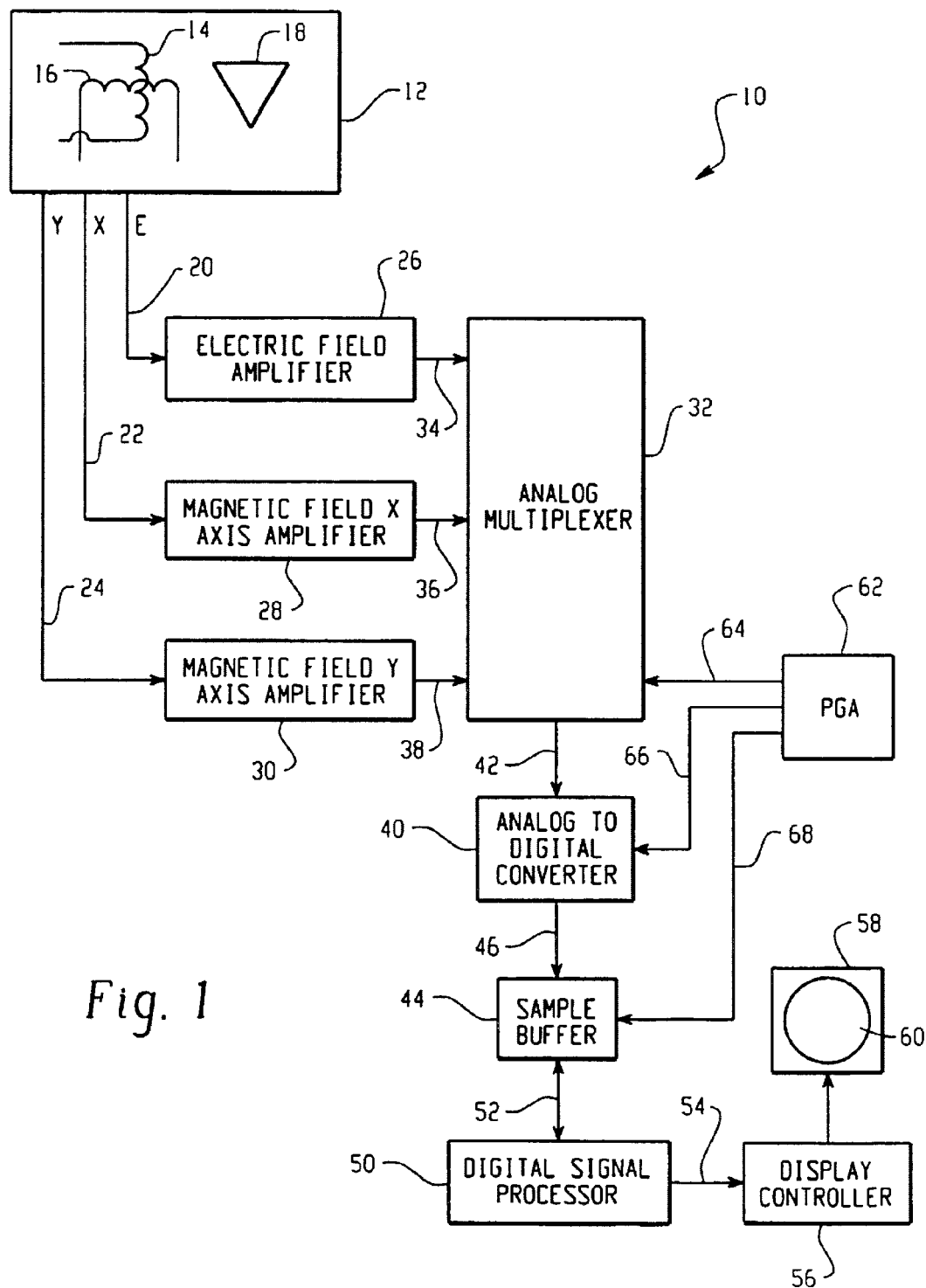
FIG. 1 is a block diagram schematic of a CAT detection system suitable for embodying the broad principles of the present invention.

FIG. 1 is a block diagram schematic of a CAT detection system 10 suitable for embodying the broad principles of the present invention. Referring to FIG. 1, a cross-looped and sense antenna 12, which may be of the type used in the Stormscope® avionics, model WX-1000, for example, is mounted on-board an aircraft for use, during flight, in monitoring the airspace ahead and surrounding the aircraft for electromagnetic radiation. More specifically, the antenna 12 comprises two antenna loops 14 and 16 arranged perpendicular to one another with one aligned to receive magnetic radiation, along the heading of the aircraft, referred to herein as the X magnetic field component, and the other to receive magnetic radiation transverse to the aircraft heading, referred to herein as the Y magnetic field component, for example. The antenna 12 further includes an electric field sense element 18 for receiving the electric field component of the electromagnetic radiation, referred to herein as the E field component.

The antenna 12 converts the received radiation components E, X, and Y into representative electrical analog signals which are output over respectively corresponding signal lines 20, 22, and 24 to amplifiers 26, 28 and 30, respectively. Each amplifier 26, 28 and 30 may be a programmable gain amplifier to amplify its respective analog signal by a programmed gain in order to keep the amplified signal level within an acceptable range for analysis. In the present embodiment, each amplifier has gain settings of 1, 2, 5 and 10, but it is understood by all those skilled in the pertinent art that other gain settings are possible. The gain setting for each amplifier may be either determined by experimentation and preset manually into the amplifier for operation, or determined from a monitoring of the analysis process during operation; in which case, the gain of an amplifier would be automatically adjusted to maintain the amplified level within an acceptable range for analysis.

The amplified E, X and Y signals are coupled to inputs of an analog multiplexer circuit 32 over respective signal lines 34, 36 and 38. The multiplexer 32 may be a conventional four channel multiplexer with one unused channel, for example. A selected input signal of the multiplexer 32 is coupled over signal line 42 to an analog-to-digital converter circuit 40, which may be of the type manufactured by Analog Devices under the model no. AD625, for example. The converter 40 is operative to digitize the signal over line 42 into a 16 bit word representative thereof, for example. Each digitized word of the converter 40 is supplied to a mass storage memory device 44, which may include one or more sample buffers, over signal lines 46. The memory 44 may be a conventional hard disk drive or a high density random access memory, for example, with the capacity to store a predetermined number of digitized samples of each of the signals E, X and Y. The sample data memory 44 may store the digitized samples of E, X and Y into respective addressable storage channels for convenient retrieval thereof for processing in a digital signal processor 50, which may be of the type manufactured by Texas Instruments under the model number TMS 320CV31, for example. The processor 50 may address each sample buffer of memory 44 to access the stored data samples over address, control and data lines 52.

In the present embodiment, two sample buffers are included in memory 44. One may be used to store data samples as they are being digitized while the other is accessed by the processor for retrieval of stored data samples for the processing thereof and vice versa. Thus, the use of dual sample buffers in memory 44 permits continuous storage and processing of data samples by alternating between the two sample buffers. In addition, the multiplexer 32 and analog-to-digital converter 40 may be integrated on a single "off-the-shelf" printed circuit card which may be of the type manufactured by Measurement Computing under the model or part no. PCI-DAS4020/12, for example.

As will become better understood from the more detailed description below, the digital signal processor 50 is programmed to analyze the data samples of the three signal components E, X and Y to detect CAT activity and determine the severity and position thereof, preferably in range and bearing in relation to the aircraft. In the present embodiment, when CAT radiation pulses are detected, their corresponding range and bearing signals are provided over signal lines 54 to a display controller 56 which drives a display monitor 58 to display the CAT activity and its position in relation to the aircraft on a display screen 60 thereof, which is viewable by the pilot. The display controller 56 and display monitor 58 may be of the type used in the Stormscope® avionics, model no. WX-1000, for example. In the alternative, information comprising the range and bearing to the CAT along with an indication of the severity thereof may be communicated across an avionics network to a weather radar display or a glass panel multi-functional avionics display, for example, and overlaid or superimposed onto an existing display image.

In addition, a programmed microcontroller or programmable gate array (PGA) 62 may be programmed with the logic to coordinate in a time sequenced manner the operations of the multiplexer 32 over signal lines 64, the analog-to-digital converter 40 over signal lines 66 and the dual sample buffer memory 44 over signal lines 68, for example. The PGA 62 may be of the field programmable type manufactured by Xilinx Inc. under model number XC95144XL, for example. In operation, the PGA 62 may control the multiplexer 32 via signal lines 64 to pass each of its input signals E, X and Y sequentially to the output line 42 periodically with a time period of approximately one microsecond, for example. Thus, each analog signal E, X, and Y is sampled by the multiplexer 32 at one microsecond intervals or at a sampling rate of one megahertz. Each signal over line 42 is given time to stabilize by the PGA 62, and then, the converter 40 is controlled via lines 66 to digitize the selected analog sample into a digital word which is presented over signal lines 46. Again, the PGA 62 allows for time for the digital word to stabilize on lines 46, then controls via lines 68 the storage thereof into the respective channel assigned to the selected sample.

In the present embodiment, each sample buffer of memory 44 is configured to store digital data sample words of each signal E, X and Y over a period of 20 milliseconds, or 20,000 data samples each. As one sample buffer fills with data samples, the other sample buffer previously filled over the preceding 20 milliseconds is accessed by the processor 50 for processing the data samples thereof. The PGA 62 may control the storage of data samples into one of the sample buffers and determine when that buffer is filled, then switch to the other sample buffer and control the storage of data samples therein. Once the other sample buffer is filled, the process is repeated. Also, as each buffer is filled with data samples, the collection of data samples which may be 20,000 data samples for each signal E, X and Y are time tagged utilizing a real time clock which maybe programmed into the PGA 62, for example.

Figure 2:
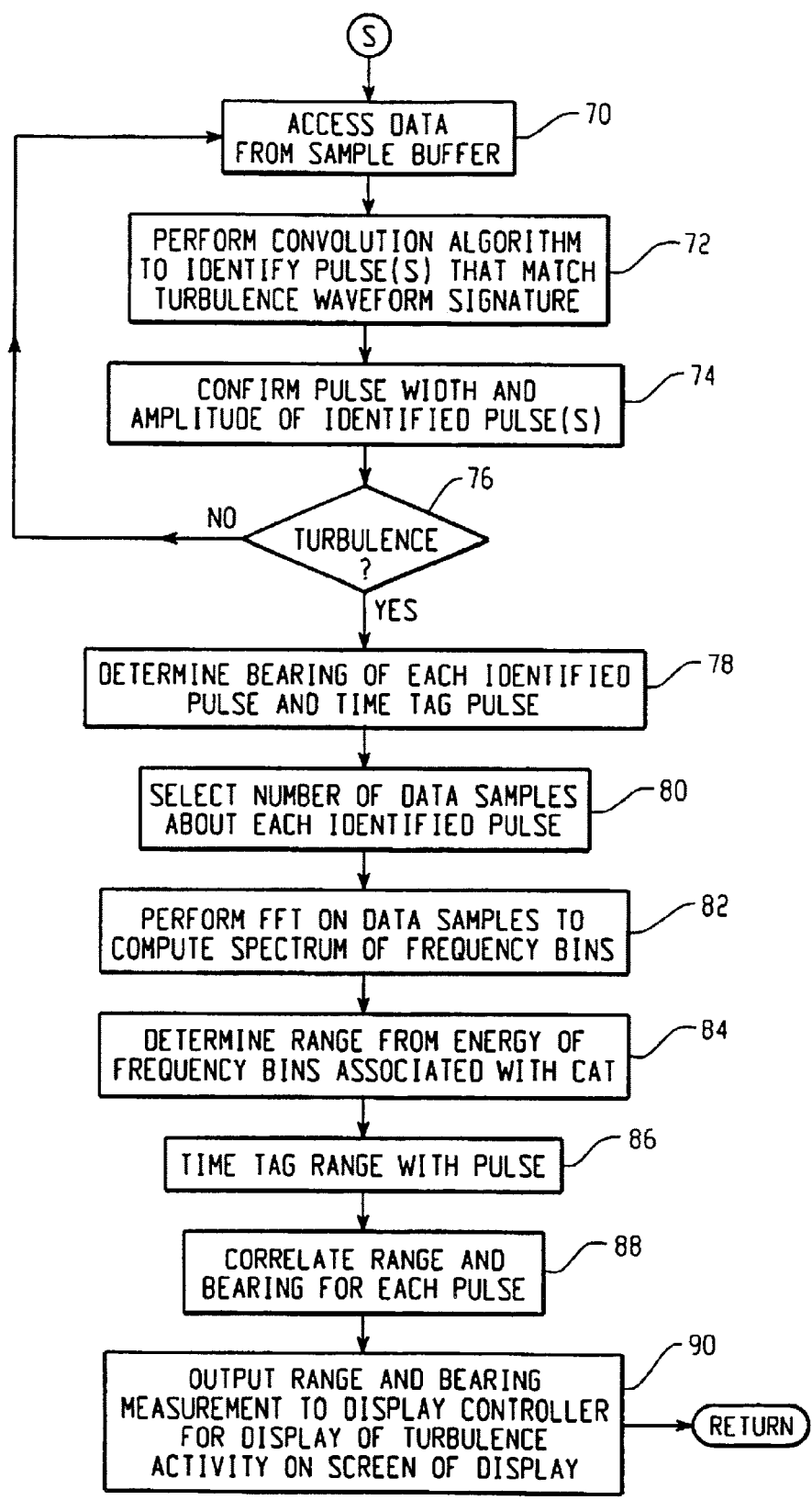
FIG. 2 depicts an exemplary flowchart suitable for use in programming the CAT detection system embodiment of FIG. 1 in accordance with the principles of the present invention.

FIG. 2 depicts an exemplary flowchart for use in programming the digital signal processor 50 to process the data samples stored in the sample buffers of memory 44. Referring to FIG. 2, the program starts execution at block 70 which instructs the processor 50 to access the data samples and corresponding time tag of the filled sample buffer of memory 44 in a sequential data stream starting with the first data sample and ending with the 20,000th data sample. In block 72, a convolution algorithm which includes the characteristics of known CAT waveform signatures embedded therein is called to process the accessed data sample stream to identify a pulse or pulses of the data stream which match a CAT waveform signature to a predetermined degree. In the present embodiment, the convolution algorithm attaches a numerical value to each pulse of a data steam processed thereby. The numerical value is representative of a percentage of a match of a pulse in the data sample stream to a CAT waveform signature. For example, if the match is perfect, the algorithm may attach the number 1.0 (100% match); if the pulse is somewhat matching, the algorithm may attach the number 0.5 (50% match) to the pulse; and if there is no match; the algorithm may attach a 0 to the pulse. Those pulses of the data sample stream which have a match above a certain numerical value are identified as candidate pulses of CAT activity and time tagged.

In the present embodiment, the samples of the data stream of the E signal may be accessed first and processed sequentially by the convolution algorithm for each E signal CAT waveform signature. This may result in repeated convolutions for each possible waveform signature. Each pulse of the E signal data stream that meets the match criteria as described herein above is time tagged and stored. The width, polarity and amplitude of each identified pulse is determined and stored along with the time tag thereof. Then, the samples of the data stream of the X signal are accessed and processed by the convolution algorithm in the same manner as the E signal data stream. Those X signal pulses that meet the match criteria are identified and time tagged along with the width and amplitude thereof. Finally, the samples of the data stream of the Y signal are accessed and processed by the convolution algorithm in the same manner and the identified pulses are time tagged along with the width and amplitudes thereof. It is understood that the order in which the E, X and Y data streams are processed by the convolution algorithm may be changed to that described above without deviating from the broad principles of the present invention.

Once the data streams of the signals E, X and Y have been processed and pulses identified and time tagged, then the identified pulses are correlated based on the time tags thereof to ensure a pulse match of all three signals. That is, if one of the signals E, X and Y does not have a pulse match at a time substantially close to or within a predetermined time window of a pulse match of the other signals, then the identified pulse may not be considered coming from CAT activity. Each pulse that meets the match criteria and time criteria across all of the signals E, X and Y is flagged as a candidate pulse of CAT activity. In the next block 74, the pulse width and amplitude of each candidate pulse identified from block 72 are compared with predetermined criteria to confirm that such pulses are CAT pulses. Thereafter, in decisional block 76, it is determined if there are any confirmed CAT pulses resulting from block 74. If so, then the bearing of each confirmed pulse is determined in relation to the heading of the aircraft in block 78 as a function of the amplitudes of the X and Y component pulses thereof. For example, the arctangent of the ratio of the Y pulse amplitude to the X pulse amplitude results in a bearing angle in relation to the heading of the aircraft. Any ambiguity in bearing may be resolved by the polarity of the associated E component pulse or by a relationship of the polarities of the correlated X, Y and E pulses of the CAT activity. Each CAT bearing measurement is stored in a memory location correlated to the time tag of its corresponding X, Y and E pulses.

Next, in block 80, a select number of data samples of the E signal component and either the X or Y signal component are taken about each confirmed pulse using the time tag thereof as a reference. It is known that CAT pulses may range from 100 to 400 microseconds in width and that each data sample represents a time interval of one microsecond. So, to ensure that the whole pulse is included, the selected number of samples may comprise around one thousand samples, for example. In block 82, a Fast Fourier Transformation (FFT) may be performed on the selected number of time data samples about each confirmed pulse. The FFT results in 1000 frequency bins for each of the E signal component and the X or Y signal component. From an energy standpoint, 500 of the frequency bins are redundant for each component. Moreover, only frequencies on the order of 100 KHz, ±50 KHz (40–50 frequency bins) are characteristic of a CAT pulse and therefore, of concern for the determination of range for each confirmed pulse.

In block 84, the composite energy of these 40–50 frequency bins is determined for use in calculating range from the aircraft to the confirmed CAT pulse. Range is determined based on the presumption that the further the CAT activity is from the aircraft, the further the radiation produced thereby has to travel, thus the weaker the energy of the signal. From this presumption, range for each confirmed pulse may be determined as an inverse function of the composite energy calculated therefor. Also, if the calculated energy for a confirmed pulse is below a predetermined level, the associated pulse may be ignored. Once the range is determined for each confirmed pulse, it is time tagged in block 86 based on the corresponding pulse and stored accordingly. Then, in block 88, the range and bearing measurements of each confirmed pulse are correlated based on the time tags thereof. These range and bearing measurements locate the position of the associated CAT activity in relation to the aircraft.

In the range calculation, it is possible that less severe close in CAT may present itself as distant CAT and vice versa when calculating range from the composite energy of one or more isolated pulses. Using the composite energies from both the E and X or Y pulses provides a form of discrimination for any ambiguities in range calculation from the composite energy of an isolated pulse. In addition, since CAT comprises multiple radiation discharges or pulses, as the aircraft approaches the CAT, a gradual increase in composite energy from known bands or bins of frequencies of the CAT pulses may be detected as described herein above. Thus, observing the trend in the composite energy from the E component and X or Y component pulses as the aircraft approaches the CAT helps to resolve any position ambiguity which may result from the composite energy of isolated groups of pulses.

Thereafter, in block 90, each range and bearing pair of measurements are supplied to the display controller 50 so that symbols corresponding to the associated CAT activity may be displayed on the screen 60 of the monitor 58 at locations in range and bearing in relation to the aircraft or communicated across the avionics network as noted above. An aircraft symbol may appear on the screen 60 so that the pilot may view a map of the CAT activity in relation to the aircraft. The program execution may then return to block 70 to repeat the processing for the data samples of the other sample buffer of memory 44. Program execution will also be deviated back to block 70 if no turbulence is detected by the decisional block 76. It is understood that, by design, the processing of the data samples of one of the sample buffers will occur in the digital signal processor at a faster rate than the rate of filling the other sample buffer with data samples. Thus, a wait loop may be designed in the program of the digital signal processor 50 to permit it to wait until the other sample buffer is filled before accessing data samples therefrom. In any event, the processor 50 may process the data samples of one sample buffer and then the other alternately in accordance with the foregoing described processing steps.

It is understood that the embodiment presented above merely describes the invention by way of example and that additions, deletions and modifications may be made thereto without deviating with the broad principles of the present invention. Accordingly, the present invention should not be limited to any single embodiment, but rather construed in breadth and broad scope in accordance with the recitation of the appended claims.

We claim:

1. A passive clear air turbulence (CAT) detection system for use on-board an aircraft, said system comprising:

an antenna for receiving electromagnetic radiation and for generating electrical signals representative thereof; and a processor for processing said electrical signals to identify pulses that match at least one CAT pulse discharge waveform signature based on predetermined criteria to detect CAT activity in relation to the aircraft.

2. The system of claim 1 including a digitizer circuit for digitizing the electrical signals at a predetermined rate to produce digital data samples thereof; and wherein the processor comprises a digital processor operative to process said digital data samples to identify pulses which match the at least one CAT waveform signature based on a predetermined criteria, said identified pulses being representative of CAT activity.

3. The system of claim 2 wherein the digital processor is programmed with a convolution algorithm having embedded therein the at least one CAT waveform signature; and wherein the digital processor is operative to process said digital data samples with said convolution algorithm to identify pulses which match the at least one CAT waveform signature based on the predetermined criteria.

4. The system of claim 2 wherein the digital processor is operative to determine a position of each identified pulse in relation to the aircraft based on the digital data samples of the corresponding identified pulse.

5. The system of claim 1 wherein the antenna includes a pair of loop antennas arranged substantially perpendicular to one another, one loop antenna of said pair for receiving an X magnetic field component of the electromagnetic radiation and generating an X electrical signal representative thereof, and the other loop antenna of said pair for receiving an Y magnetic field component of the electromagnetic radiation and generating an Y electrical signal representative thereof.

6. The system of claim 5 wherein the one loop antenna is aligned to receive magnetic field radiation along the heading of the aircraft and the other loop antenna is aligned to receive magnetic field radiation transverse to the heading of the aircraft.

7. The system of claim 5 including: a sampling circuit coupled to the antenna for time sampling the X and Y electrical signals at a predetermined rate to produce time samples thereof; and a digitizing circuit coupled to the sampling circuit for digitizing the time samples of the X and Y electrical signals into X and Y digital data samples, respectively; and wherein the processor comprises a digital processor operative to process said X digital data samples to identify an X pulse which matches at least one CAT waveform signature for the X electrical signal based on a first predetermined criteria and to process said Y digital data samples to identify an Y pulse which matches at least one CAT waveform signature for the Y electrical signal based on a second predetermined criteria.

8. The system of claim 7 wherein the digital processor is programmed with a convolution algorithm having embedded therein at least one CAT waveform signature for each of the X and Y electrical signals; and wherein the digital processor is operative to process the X digital data samples with said convolution algorithm to identify an X pulse which matches at least one CAT waveform signature for the X electrical signal based on the first predetermined criteria and to process the Y digital data samples with said convolution algorithm to identify an Y pulse which matches at least one CAT waveform signature for the Y electrical signal based on the second predetermined criteria.

9. The system of claim 7 wherein the digital processor is operative to correlate the X and Y identified pulses as belonging to the same CAT activity and to determine a bearing of said CAT activity in relation to the aircraft based on a function of amplitudes of the identified X and Y pulses of said CAT activity.

10. The system of claim 9 wherein the digital processor is operative to determine a range of the CAT activity in relation to the aircraft based on a composite energy of the digital data samples of the corresponding pulse.

11. The system of claim 10 wherein the digital processor is operative to select a predetermined number of digital data samples of one of the X and Y pulses, to transform said selected digital data samples into corresponding frequency bins, and to calculate the composite energy from a selected number of said frequency bins.

12. The system of claim 10 including a display monitor; and a display controller coupled to the digital processor for controlling an image displayed on the display monitor; wherein the digital processor is operative to provide to the display controller range and bearing data of CAT activity; and wherein the display controller is responsive to the range and bearing data to control the display monitor to display a symbol of CAT activity in the display image at a representative range and bearing in relation to the aircraft.

13. The system of claim 7 wherein the antenna includes an electric field sense element for receiving an electric field component of the electromagnetic radiation and generating an E electrical signal representative thereof; wherein the sampling circuit is further operative to time sample the E electrical signal at the predetermined rate to produce time samples thereof, and the digitizing circuit is further operative to digitize the time samples of the E electrical signals into E digital data samples; and wherein the digital processor is operative to process said E digital data samples to identify an E pulse which matches at least one CAT waveform signature for the E electrical signal based on a third predetermined criteria.

14. The system of claim 13 wherein the digital processor is programmed with a convolution algorithm having embedded therein at least one CAT waveform signature for E electrical signal; and wherein the digital processor is operative to process the E digital data samples with said convolution algorithm to identify an E pulse which matches at least one CAT waveform signature for the E electrical signal based on the third predetermined criteria.

15. The system of claim 13 wherein the digital processor is operative to correlate the E, X and Y identified pulses as belonging to the same CAT activity and to determine a bearing of said CAT activity in relation to the aircraft based on a function amplitudes of the identified X and Y pulses of said CAT activity.

16. The system of claim 15 wherein the digital processor is operative to determine a range of the CAT activity in relation to the aircraft based on a composite energy of digital data samples of the corresponding pulse.

17. The system of claim 16 wherein the digital processor is operative to select a predetermined number of digital data samples of one of the X and Y pulses and of the E pulse, to transform said selected digital data samples into corresponding frequency bins, and to calculate the composite energy from a selected number of said frequency bins.

18. The system of claim 1 including a digitizer circuit for digitizing the electrical signals at a predetermined rate to produce digital data samples thereof; a buffer memory coupled to the digitizer circuit and processor for storing a predetermined number of digital data samples; and wherein the processor comprises a digital processor operative to access digital data samples from said buffer memory and to process said accessed digital data samples to identify pulses which match the at least one CAT waveform signature based on a predetermined criteria, said identified pulses being representative of CAT activity.

19. The system of claim 18 wherein the buffer memory comprises first and second buffer memories which are alternately operative to store the predetermined number of digital data samples; and wherein the processor is operative to alternately access digital data samples between the first and second buffer memories.

20. The system of claim 19 including a control circuit for operating the digitizer circuit and buffer memory in a predetermined time sequential order.

21. A method of detecting clear air turbulence (CAT) from an aircraft, said method comprising the steps of:
receiving electromagnetic radiation and generating electrical signals representative thereof; and
processing said electrical signals to identify pulses that match at least one CAT pulse discharge waveform signature based on predetermined criteria to detect CAT activity in relation to the aircraft.

22. The method of claim 21 including the steps of: digitizing the electrical signals at a predetermined rate to produce digital data samples thereof; and digitally processing said digital data samples to identify pulses which match the at least one CAT waveform, signature based on a predetermined criteria, said identified pulses being representative of CAT activity.

23. The method of claim 22 wherein the step of digitally processing includes digitally processing the digital data samples with a convolution algorithm having embedded therein the at least one CAT waveform signature to identify pulses which match the at least one CAT waveform signature based on the predetermined criteria.

24. The method of claim 22 including determining a position of each identified pulse in relation to the aircraft based on the digital data samples of the corresponding identified pulse.

25. The method of claim 21 wherein the step of receiving includes the steps of: receiving an X magnetic field component of the electromagnetic radiation and generating an X electrical signal representative thereof, and receiving an Y magnetic field component of the electromagnetic radiation and generating an Y electrical signal representative thereof.

26. The method of claim 25 wherein the X magnetic field component is received along the heading of the aircraft and the Y magnetic field component is received transverse to the heading of the aircraft.

27. The method of claim 25 including the steps of: time sampling the X and Y electrical signals at a predetermined rate to produce time samples thereof; and digitizing the time samples of the X and Y electrical signals into X and Y digital data samples, respectively; and wherein the step of processing comprises: digitally processing said X digital data samples to identify an X pulse which matches at least one CAT waveform signature for the X electrical signal based on a first predetermined criteria and digitally processing said Y digital data samples to identify an Y pulse which matches at least one CAT waveform signature for the Y electrical signal based on a second predetermined criteria.

28. The method of claim 27 wherein the step of processing includes: digitally processing the X digital data samples with a convolution algorithm having embedded therein the at least one CAT waveform signature for the X electrical signal to identify an X pulse which matches the at least one CAT waveform signature for the X electrical signal based on the first predetermined criteria; and digitally processing the Y digital data samples with a convolution algorithm having embedded therein the at least one CAT waveform signature for the Y electrical signal to identify an Y pulse which matches the at least one CAT waveform signature for the Y electrical signal based on the second predetermined criteria.

29. The method of claim 27 including the steps of: correlating the X and Y identified pulses as belonging to the same CAT activity; and determining a bearing of said CAT activity in relation to the aircraft based on a function of amplitudes of the identified X and Y pulses of said CAT activity.

30. The method of claim 29 including the step of determining a range of the CAT activity in relation to the aircraft based on a composite energy of the digital data samples of the corresponding pulse.

31. The method of claim 30 including the steps of: selecting a predetermined number of digital data samples of one of the X and Y pulses; transforming said selected digital data samples into corresponding frequency bins; and calculating the composite energy from a selected number of said frequency bins.

32. The method of claim 30 including the step of displaying a map of CAT activity to an operator in a display image wherein each CAT activity is displayed with a symbol at its representative range and bearing in relation to the aircraft.

33. The method of claim 27 including the steps of: receiving an electric field component of the electromagnetic radiation and generating an E electrical signal representative thereof; time sampling the E electrical signal at the predetermined rate to produce time samples thereof, digitizing the time samples of the E electrical signals into E digital data samples; and digitally processing said E digital data samples to identify an E pulse which matches at least one CAT waveform signature for the E electrical signal based on a third predetermined criteria.

34. The method of claim 33 including digitally processing the E digital data samples with a convolution algorithm having embedded therein at least one CAT waveform signature for E electrical signal to identify an E pulse which matches at least one CAT waveform signature for the E electrical signal based on the third predetermined criteria.

35. The method of claim 33 including the steps of: correlating the E, X and Y identified pulses as belonging to the same CAT activity and determining a bearing of said CAT activity in relation to the aircraft based on a function of amplitudes of the identified X and Y pulses of said CAT activity.

36. The method of claim 35 including the step of determining a range of the CAT activity in relation to the aircraft based on a composite energy of digital data samples of the corresponding pulse.

37. The method of claim 36 wherein the step of determining range includes the steps of: selecting a predetermined number of digital data samples of one of the X and Y pulses and of the E pulse; transforming said selected digital data samples into corresponding frequency bins; and calculating the composite energy from a selected number of said frequency bins.

38. The method of claim 37 wherein the step of transforming includes performing a fast Fourier transformation on the selected number of digital data samples.

39. The method of claim 37 wherein the number of frequency bins are selected based on frequency characteristics of CAT.

40. The method of claim 21 including the steps of: digitizing the electrical signals at a predetermined rate to produce digital data samples thereof; buffering a predetermined number of digital data samples; and processing said buffered digital data samples to identify pulses which match the at least one CAT waveform signature based on a predetermined criteria, said identified pulses being representative of CAT activity.

41. A passive clear air turbulence (CAT) detection system for use on-board an aircraft, said system comprising:

an antenna for receiving X and Y magnetic field components of electromagnetic radiation and generating X and Y electrical signals representative thereof, and for receiving an electric field component of electromagnetic radiation and for generating an E electrical signal representative thereof;

a digitizer circuit for digitizing said E, X and Y electrical signals at a predetermined rate to produce E, X and Y digital data samples respectively representative thereof;

a buffer memory for storing a predetermined number of each of said E, X and Y digital data samples into respective E, X and Y storage channels thereof; and a digital processor for:

accessing said E digital data samples from the buffer memory and processing the accessed digital data samples with a convolution algorithm having embedded therein at least one CAT waveform signature for the E electrical signal to identify an E pulse which matches the at least one CAT waveform signature for the E electrical signal based on a first predetermined criteria;

accessing said X digital data samples from the buffer memory and processing the accessed digital data samples with a convolution algorithm having embedded therein at least one CAT waveform signature for the X electrical signal to identify an X pulse which matches the at least one CAT waveform signature for the X electrical signal based on a second predetermined criteria;

accessing said Y digital data samples from the buffer memory and processing the accessed digital data samples with a convolution algorithm having embedded therein at least one CAT waveform signature for the Y electrical signal to identify an Y pulse which matches the at least one CAT waveform signature for the Y electrical signal based on a third predetermined criteria;

said processor operative to identify CAT activity by time correlating said identified E, X and Y pulses to determine a position of the CAT activity in relation to the aircraft based on digital data samples of the corresponding E, X and Y pulses.

42. The system of claim 2 wherein the digital processor is operative to determine a range of the CAT activity in relation to the aircraft based on a composite energy of the digital data samples of the corresponding identified pulse.

43. The method of claim 22 including the step of determining a range of the CAT activity in relation to the aircraft based on a composite energy of the digital data samples of the corresponding identified pulse.

* * * * *

UNITED STATES PATENT AND TRADEMARK OFFICE
CERTIFICATE OF CORRECTION

PATENT NO. : 6,856,908 B2
DATED : February 15, 2005
INVENTOR(S) : Krishna Devarasetty and Ken L. Rodgers It is certified that error appears in the above-identified patent and that said Letters Patent is hereby corrected as shown below:

<u>Column 5,</u>
Line 41, "maybe" should be -- may be --.

<u>Column 9,</u>
Line 45, insert -- of -- after "function".

<u>Column 10,</u>
Line 21, delete "," after "waveform".

<u>Column 12,</u>
Line 49, insert -- and -- after "pulses".

Signed and Sealed this

Twenty-fifth Day of April, 2006

JON W. DUDAS
*Director of the United States Patent and Trademark Office*